United States Patent
Atkins et al.

(10) Patent No.: US 6,497,849 B2
(45) Date of Patent: Dec. 24, 2002

(54) SYNTHESIS OF HETEROPOLYACIDS

(75) Inventors: Martin Philip Atkins, Ashford (GB); Benjamin Patrick Gracey, Hull (GB); James Noel Martin Hegarty, Hull (GB); Mark Royston Smith, Beverley (GB)

(73) Assignee: BP Chemicals Limited, London (GB)

( * ) Notice: Subject to any disclaimer, the term of this patent is extended or adjusted under 35 U.S.C. 154(b) by 3 days.

(21) Appl. No.: 09/873,386

(22) Filed: Jun. 5, 2001

(65) Prior Publication Data

US 2002/0054847 A1 May 9, 2002

Related U.S. Application Data

(63) Continuation of application No. PCT/GB99/03960, filed on Nov. 26, 1999.

(30) Foreign Application Priority Data

Dec. 18, 1998 (GB) ............................................. 9828020

(51) Int. Cl.$^7$ ........................... B01D 11/00; B01J 21/06
(52) U.S. Cl. ........................ 423/54; 423/307; 423/326; 423/658.5; 502/204; 502/206; 502/255; 502/256
(58) Field of Search ......................... 423/54, 307, 326, 423/658.5; 502/255, 256, 204, 206

(56) References Cited

U.S. PATENT DOCUMENTS

| | | | | |
|---|---|---|---|---|
| 3,361,518 A | | 1/1968 | Chiola et al. ................... 23/23 |
| 3,440,732 A | | 4/1969 | Chiola et al. ..................... 34/5 |
| 5,097,077 A | * | 3/1992 | Mueller et al. ............. 568/617 |
| 5,824,769 A | * | 10/1998 | Weyer et al. ................ 528/485 |
| 5,951,829 A | * | 9/1999 | Weyer et al. .................. 203/38 |
| 6,043,184 A | * | 3/2000 | Karmakar et al. ........... 502/208 |
| 6,414,109 B1 | * | 7/2002 | Akedo ......................... 528/410 |

OTHER PUBLICATIONS

Prevost et al, "Characterization of $H_4Pmo_{11}VO_{40}$ heteropolyacid . . . ," Journal of the Chemical Society Paraday Transactions, vol. 92, No. 24, pp. 5103–5110 (1996).

Tsigdinos et al, "Molybdovanadophosphoric Acids and Their Salts," Inorganic Chemistry, vol. 7, No. 3, pp. 437–441 (1998).

* cited by examiner

Primary Examiner—Porfirio Nazario-Gonzalez
(74) Attorney, Agent, or Firm—Nixon & Vanderhye

(57) ABSTRACT

This invention relates to a process for purifying a heteropolyacid which comprises: subjecting an aqueous solution comprising (i) the heteropolyacid and (ii) salt impurities to at least one liquid/liquid extraction step with an organic solvent, characterized in that the organic solvent comprises a dihydrocarbyl ether having at least 5 carbon atoms.

13 Claims, No Drawings

SYNTHESIS OF HETEROPOLYACIDS

This is a continuation of PCT application PCT/GB99/03960, filed Nov. 26, 1999, the entire content of which is hereby incorporated by reference in this application.

The present invention relates to a process for the purification of a heteropolyacid, and in particular, to a process for the purification of a silicotungstic acid.

It is well known that heteropolyacids substantially free of extraneous cations (hereafter "free heteropolyacids") are valuable chemical compounds which can be used as acid catalysts in organic reactions such as the addition reaction of lower aliphatic carboxylic acids to olefins to form the corresponding esters. One such method is described in our EP-A-0757027 which describes the use of free heteropolyacids as catalysts for the production of aliphatic esters such as ethyl acetate in an addition reaction as described above. Methods of synthesising heteropolyacids are also well known. For instance, such processes are described e.g. by North, E O in "Organic Synthesis", 1, page 129 (1978), Editor H S Booth, Robert E Krelger publishing company Huntington, N.Y.) and by Tatsuhiko, H et al in Kogyo Kagaku Zasshi, 72 (9), 1945–48 (1969).

Known methods for the preparation of heteropolyacids generally involve three stages, namely:

a. A reaction stage in which the tungstosilicic acid is formed by the addition of hydrochloric acid to a refluxing aqueous solution of sodium tungstate and sodium silicate. Upon neutralisation and hydrolysis, the reaction results in the formation of a brine solution containing a tungstosilicic acid Keggin structural unit. Overall, the reaction can be summarized as follows:

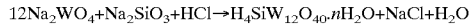

$$12Na_2WO_4 + Na_2SiO_3 + HCl \rightarrow H_4SiW_{12}O_{40} \cdot nH_2O + NaCl + H_2O$$

The product is filtered, acidified and cooled prior to purification.

b. A product recovery and purification stage in which the cooled product solution from (a) is purified by at least one liquid/liquid extraction step using an organic solvent. The solvent is such that it is capable of forming a solvent/heteropolyacid complex which is largely insoluble in the acidified aqueous brine. The resulting solvent/complex phase enables the disengagement of the contaminating inorganic salts from the brine solution.

c. A product regeneration stage in which an aqueous solution of the heteropolyacid is regenerated from the solvent/complex phase produced in step b). This regeneration is achieved by adding water to displace the solvent involved in the formation organic/complex phrase. The organic solvent is removed from the mixture by distillation. The organic solvent is conveniently removed as a solvent/water azeotrope. This azeotrope may form a two phase mixture on cooling. The denser of these two phases is an aqueous phase, which may be recycled to the reboiler. The less dense phase is an organic phase, which may be recovered, for example, for reuse. The amount of water added and removed can be adjusted to yield a 20–80%w/w aqueous solution of heteropoly acid.

The resultant concentrated aqueous solution of the heteropolyacid product can then be used to impregnate an inorganic support.

The known synthetic methods referred to above mention the use of diethyl ether, methyl ether ketone and ethyl acetate as possible solvents for purification of the product. We have found that all these materials have inherent disadvantages. For instance, diethyl ether has a high volatility and low auto-ignition point;

methyl ethyl ketone gives rise to colour formation due to desired acid catalysing an aldol type reaction with the solvent ketone; and esters such as ethyl acetate have a propensity to undergo hydrolysis in the presence of the heteropolyacid being synthesised and any neutralising acids present therein.

It has now been found that these disadvantages can be mitigated if a suitable solvent is used during the purification stages.

According to a first aspect of the present invention, there is provided a process for purifying a heteropolyacid which comprises:

subjecting an aqueous solution comprising (i) the heteropolyacid and (ii) salt impurities to at least one liquid/liquid extraction step with an organic solvent, characterised in that the organic solvent comprises a dihydrocarbyl ether having at least 5 carbon atoms.

In other words, the dihydrocarbyl ether is such that the total number carbon atoms in the two hydrocarbyl units, one on either side of the ethereal oxygen atom, is at least 5.

The liquid/liquid extraction step enables the heteropolyacid to form a complex in situ with the organic solvent. This allows the extract to separate into two or more phases including inter alia a dense organic phase, which generally settles at or towards the bottom of the separation vessel. This phase comprises the dissolved complex of the heteropolyacid.

Preferably, the dense organic phase is recovered. This may be mixed with water to form a separate layer of a dilute aqueous mixture, from which a concentrated 20–80% w/w solution of the heteropolyacid substantially free of organic impurities may be isolated.

The starting aqueous solution of heteropolyacid may be prepared by reacting (i) an aqueous solution of one or more alkali or alkaline earth metal salts selected from a tungstate and a molybdate with (ii) an alkali or an alkaline earth metal silicate or an alkali or an alkaline earth metal phosphate. Preferably, this reaction is carried out under reflux. The ensuing reaction produces an impure aqueous solution comprising the heteropolyacid of the chosen salt and any other salt formed in situ or used as a reactant. This solution may then be filtered, cooled and subjected to the liquid/liquid extraction step of the first aspect of the present invention.

Preferably, the heteropolyacid in the aqueous solution is a silicotungstic acid.

According to a second aspect of the present invention, there is provided a process for the synthesis of a heteropolyacid substantially free of extraneous cations, said process comprising:

a. reacting (i) an aqueous solution of one or more alkali or alkaline earth metal salts selected from a tungstate and a molybdate under reflux with (ii) an alkali or an alkaline earth metal silicate or an alkali or an alkaline earth metal phosphate in the presence of an acid to form in an impure aqueous solution comprising the heteropolyacid of the chosen salt and any other salt formed in situ or used as a reactant;

b. filtering and cooling the impure aqueous solution comprising the heteropolyacid;

c. purifying the cooled, impure aqueous solution from (b) by at least one liquid/liquid extraction with an organic solvent to enable the heteropolyacid to form a complex in situ with the organic solvent and allowing the extract to separate into two or more phases including inter alia a dense organic phase which comprises the dissolved complex of the heteropolyacid and which dense organic phase is below the aqueous phase;

d. recovering the dense organic phase from (c) and mixing it thoroughly with water to form a separate layer of a dilute aqueous mixture and e. recovering a concentrated 20–80%w/w aqueous solution of the heteropolyacid substantially free of organic impurities from the dilute aqueous mixture, wherein the organic solvent used in the liquid/liquid extraction step (c) comprises a dihydrocarbyl ether having at least 5 carbon atoms.

Preferably, the organic solvent used in the liquid/liquid extraction step (c) is a dihydrocarbyl ether having at least 5 carbon atoms.

The dihydrocarbyl ether may have 5–20 carbon atoms, and preferably, has 5–10 carbon atoms. The dihydrocarbyl ether may be such that at least one of the hydrocarbyl groups is a branched chain alkyl group. Preferably, the branched chain alkyl group is t-butyl or amyl. At least one of the hydrocarbyl groups in the ether may be a methyl, ethyl or propyl group. Preferably, this hydrocarbyl group is a methyl or ethyl group, and most preferably, it is a methyl group. It may be advantageous to employ ethers which have different hydrocarbyl groups on either side of the ethereal oxygen. For example, the ether may have a methyl group on one side of the ethereal oxygen, and a butyl or amyl group on the other.

The ether used should be substantially immiscible with water. In other words, the ether should be substantially insoluble in water, and water should be substantially insoluble in the ether. The ether when complexed with HPA should also be immiscible with water in order to facilitate the removal of any salt from the extract.

Suitable ethers generally have a boiling point above 40° C., preferably between 40° C. and 60° C., more preferably between 50° C. and 60° C., for example, between 55 and 56° C. In some applications, ethers having boiling points of above 90° C. may also be suitable.

Suitable ethers include propyl butyl ether (e.g. propyl t-butyl ether), ethyl propyl ether, dipropyl ether (e.g. di-n-propyl ether (bp 88–90° C.) and di-isopropyl ether), butyl glycol ether, di-butyl ether (e.g. disobutyl ether, di t-butyl ether, di n-butyl ether), methyl butyl ether (e.g. methyl n-butyl ether [bp 70–71° C.], methyl sec butyl ether [bp 75° C.], methyl tertiary butyl ether [bp 55–56° C.]), methyl amyl ether (e.g. 4-tert-amyl methyl ether [bp 85–86° C.]), butyl ethyl ether (e.g. n-butyl ethyl ether [bp 91–92° C.], tert-butyl ethyl ether (bp 72–73° C.)), and propyl butyl ether. Of these, methyl tertiary amyl ether and more particularly, methyl tertiary butyl ether (hereafter "MTBE") are preferred. An advantage of using such ethers as solvents is that they would reduce the total organic content of any effluent due to their low water solubility.

Step a) may be preceded by the preparation of an aqueous solution of at least one alkali or alkaline earth metal salt of a tungstate or a molybdate. Such solutions may be prepared using demineralised water to minimise the contamination of the final heteropolyacid desired by extraneous ions. Preferably, a solution of sodium molybdate or sodium tungstate is prepared.

The aqueous solution of at least one alkali or alkaline earth metal salt of a tungstate or a molybdate is then refluxed with an alkali or an alkaline earth metal silicate or phosphate (step a). The silicate or phosphate may be used as a solid or as an aqueous solution. Preferably, a silicate is used.

The ensuing reaction produces a mixture comprising an impure solution of the mixed heteropolyacid of the chosen salt, which may be generated initially as the salt of a partially acidified heteropolyacid (e.g. $H_2Na_2$-heteropolyacid) or the fully acidified heteropolyacid ($H_4$-heteropolyacid). This resultant solution is then filtered, cooled, and preferably, acidified.

The reaction of step a) is carried out in the presence of an acid, which neutralises the reaction mixture. The heteropolyacid unit is believed to assemble during this neutralisation step. Suitable acids for the neutralisation step include mineral acids such as hydrochloric acid.

Preferably, acid is introduced into the reaction mixture of step a) through the reflux flow. The addition of acid is controlled so as to prevent the precipitation of the compounds such as e.g. tungstic acid.

More preferably, the addition of hydrochloric acid to the reaction is carried out in two stages. Firstly, as mentioned above, during step a) so as to neutralise the reaction mixture, and secondly, before the refluxed reaction mixture is liquid/liquid extracted in step c). This second acidification may be carried out as the mixture of step a) is cooled and filtered, but preferably, is carried out after the cooling and filtration step. The purpose of the second acid addition stage is (i) to ensure that the reactant salts are appropriately hydrolysed, (ii) to convert the heteropolyacid present in the reaction mixture to the $H_4$ form, and (iii) to prevent ionisation in the aqueous solution. Since ionisation of the heteropolyacid in solution aids the dissolution thereof in water, the acidification of the solution by addition of an acid, and in particular, a strong mineral acid, suppresses this tendency of the heteropolyacid to ionise. This not only decreases its water solubility but also allows it to be extracted more easily by solvent extraction.

The acidified, cooled and filtered solution is then subjected to at least one liquid/liquid extraction step (step c). Preferably, a plurality of such extraction steps are employed. The liquid/liquid extraction is carried out using an organic solvent, which complexes with the heteropolyacid in situ. It should be noted that not all solvents are capable of forming such a complex; for example, cyclohexane is incapable of forming such a complex with the heteropolyacid.

The liquid/liquid extract is then allowed to separate into two or more phases. The complex of the heteropolyacid is soluble in the extracting organic solvent, and forms a solution which separates as a dense organic phase.

In certain embodiments of the invention, the extract separates into three phases: an upper organic phase which comprises mainly the solvent with traces of heteropolyacid, a middle aqueous phase which comprises mainly water and some of the acids and salts used or formed during the synthesis reaction and finally, a lower dense organic phase which contains the desired heteropolyacid complex of interest. The liquid/liquid extraction behaviour of such systems is unusual in that a complex of the heteropolyacid and the extracting solvent is formed in the lower dense organic phase when the components are mixed together.

The efficiency of the extraction will depend upon the extent of disengagement of the phases in the extract. In particular, the organic phase comprising the complex of the organic solvent and the heteropolyacid may appear to be initially hazy due to entrapped salts/aqueous phase of the reactant inorganic compounds and any salts formed in situ during the reaction. Such a haze may be removed using, for example, demisting treatments. Suitable demisting treatments include centrifugation and filtration methods.

The solution comprising the complex of the heteropolyacid is separated from the other phase(s). Preferably, this solution is admixed with water, which may advantageously be demineralised and/or de-ionised prior to the admixing step. The organic solvent may suitably be removed from the resultant admixture by azeotropic distillation in a column.

The preferred organic solvents can form decanting mixtures, which allow facile separation of a bottom aqueous layer from the top organic phase. The aqueous layer can be returned to the distillation column or removed as a column heads take off. The amount of water employed to prepare the admixture can be adjusted prior to the distillation; similarly, the amount of water remaining after the distillation can also be adjusted to yield a solution of heteropolyacid 20–80%w/w of said heteropolyacid.

An alternative method of preparing an aqueous solution of the free heteropolyacid is to distil the organic phase under vacuum to remove the solvent and then take up the residue in water. Care, however, should be taken with vacuum drying as extended heating under vacuum even mild conditions (e.g. 100° C., 16 hrs, 0.01 mmHg) can lead o some heteropolyacid loss by generation of by-products.

The term "heteropolyacid" as used herein and throughout the specification is meant to include the free acids. The heteropolyacids may be used to prepare esterification catalysts and olefin addition catalysts. When employed for such applications, the heteropolyacids may be used as free acids and or partial salts. The synthesis of heteropolyacids in accordance with the present invention. Allows the purity of such salts to be controlled.

Typically, the heteropolyacid, or the anionic component of its corresponding salt comprises 2–18 oxygen-linked polyvalent metal atoms, which are called peripheral atoms. These peripheral atoms surround one or more central atoms in a symmetrical manner. The peripheral atoms are usually one or more of molybdenum, tungsten, vanadium, niobium, tantalum and other metals. The central atoms are usually silicon or phosphorus but can comprise any one of a large variety of atoms from Groups I–VIII in the Periodic Table of elements. These include, for instance, cupric ions; divalent beryllium, zinc, cobalt or nickel ions; trivalent boron, aluminium, gallium, iron, cerium, arsenic, antimony, phosphorus, bismuth, chromium or rhodium ions; tetravalent silicon, germanium, tin, titanium, zirconium, vanadium, sulphur, tellurium, manganese nickel, platinum, thorium, hafnium, cerium ions and other rare earth ions; pentavalent phosphorus, arsenic, vanadium, antimony ions; hexavalent tellurium ions; and heptavalent iodine ions. Such heteropolyacids are also known as "polyoxoanions", "polyoxometallates" or "metal oxide clusters". The structures of some of the well known anions are named after the original researchers in this field and are known e.g. as Keggin, Wells-Dawson and Anderson-Evans-Perloff structures.

Heteropolyacids usually have a high molecular weight e.g. in the range from 700–8500 and include dimeric complexes. They have a relatively high solubility in polar solvents such as water or other oxygenated solvents, especially if they are free acids and in the case of several salts, and their solubility can be controlled by choosing the appropriate counter-ions. Specific examples of heteropolyacids that may be synthesised in the present invention include:

| | |
|---|---|
| 12-tungstophosphoric acid | $H_3[PW_{12}O_{40}].xH_2O$ |
| 12-molybdophosphoric acid | $H_3[PMo_{12}O_{40}].xH_2O$ |
| 12-tungstosilicic acid | $H_4[SiW_{12}O_{40}].xH_2O$ |
| 12-molybdosilicic acid | $H_4[SiMo_{12}O_{40}].xH_2O$ |

The present invention is particularly suitable for the synthesis and purification of silicotungstic acid.

The heteropolyacids purified or synthesised by the present invention may be impregnated into a support. This may be achieved by dissolving the heteropolyacid in distilled water, and then adding the support to the aqueous solution so formed. The support is suitably left to soak in the acid solution for a duration of several hours, with periodic manual stirring, after which time it is suitably filtered using a Buchner funnel in order to remove any excess acid.

The wet catalyst thus formed is then suitably placed in an oven at elevated temperature for several hours to dry, after which time it is allowed to cool to ambient temperature in a desiccator. The catalyst can also be dried suitably by using a flow of heated gas such as e.g. nitrogen or air. The catalyst loading in g/liter was determined by deducting the weight of the support used from the weight of the catalyst on drying.

Alternatively, the support may be impregnated with the catalyst using the incipient wetness technique and dried by using a flow of heated gas such as e.g. nitrogen or air.

This supported catalyst (measured by weight) can then be used in processes such as e.g. the hydration of olefins to form alcohols or the addition of aliphatic monocarboxylic acids to olefins to form the corresponding ester. The amount of heteropolyacid deposited/impregnated on the support for use in the addition reaction for making esters is suitably in the range from 10 to 60% by weight, preferably from 20 to 50% by weight, more preferably from 20–35% by weight (corresponding to a loading in the range of about 100–215 g/liter) based on the total weight of the heteropolyacid and the support.

The present invention is further illustrated with reference to the following Examples:

EXAMPLES

To illustrate the key process features, critical factors and associated timings the laboratory scale synthesis is described below in detail. The overall yield in laboratory experiments based on tungsten was >95%. It should be noted that the molecular weight for tungstosilicic acid is 2878, or, 2986 if obtained as a hydrate.

All the reagents used were purchased from Aldrich:

| | |
|---|---|
| Sodium silicate solution-water glass | Catalogue No. 33,844-3 |
| Sodium tungstate hydrate | Catalogue No. 22,333-6 |
| Hydrochloric acid-37% w/w | Catalogue No. 25,814-8 |
| Water-HPLC grade | Catalogue No. 27,073-3 |
| Methyl tertiary butyl ether (MTBE) | Catalogue No. 17,978-7 |

Sodium silicate solid can be used in the place of sodium silicate solution. High quality de-ionised water can be used in the place of HPLC water. Only PTFE and glass were allowed in contact with the reagents and reaction products. It was found that contact of the tungstosilicic acid with metals such as stainless steel resulted in the formation of deep blue product. The apparatus was cleaned with hydrochloric acid prior to use.

A. The following apparatus was assembled; an electrically heated 3-liter flanged flask, equipped with an efficient impeller type overhead polytetrafluoroethylene (PTFE) stirrer, Liebig condenser, and a dropping funnel. No attempt was made to exclude air during these operations.

The flask was charged with:

500 g of sodium tungstate 37.5 g of sodium silicate solution 1000 ml water.

The reaction mixture was heated to reflux during which heating the sodium tungstate fully dissolved to give a clear solution. Heating to reflux was found to be essential for the success of the synthesis as failure to do so resulted in the formation of a bright yellow precipitate of tungstic acid during the addition of hydrochloric acid (300 ml Over 20 minutes). Even at reflux of the reaction mixture (ca 105° C.), the rate of the addition of hydrochloric acid has to be controlled to prevent precipitation of tungstic acid at the point of addition. The reaction mixture during this addition became slightly cloudy and pale yellow due to the formation of a precipitate of silica. The mixture was then cooled and filtered through a No. 3 porosity glass Buckner type filter and returned to the flask. The pale yellow precipitate was estimated as 10 g. The now almost colourless clear solution was again heated to reflux and then a further 200 ml of hydrochloric acid added to the mixture over 10 minutes. The now pale yellow mixture was allowed to cool to room temperature to yield an aqueous solution (2131.5 g). No further precipitate was observed.

B. A one-liter separating funnel was charged with 321.7 g (255 ml) of aqueous solution from stage (A) above, 143 ml MTBE. The mixture was shaken for 2 minutes and allowed to settle into three layers. The initial settling into layers occurred rapidly but it was noted that droplets of complex were formed at the interface of the top layer and aqueous layer for about 3 minutes and these dropped down into the bottom layer. After ten minutes the following layers were obtained Organic top layer 50 ml, 58.4 g (tungstosilicic acid content<1 g)
Middle layer 320 ml, 321.7 g
Dense bottom layer 60 ml, 89.2 g (tungstosilicic acid content 54.2 g)

The yield from these extractions indicated that a yield of >95% recovered tungstosilicic acid (based on tungsten) is achievable. The top organic layer can be reused in the place of MTBE in other first reaction mixture extractions.

The appearance of the colourless, dense bottom layer after 10 minutes was slightly hazy and it had a viscosity similar to ethylene glycol and had a sodium content of >300 ppm. The haziness disappeared on extended standing (16 hrs) and the sodium content of this clear product was <10 ppm. The efficiency of this disengagement of the brine from the dense bottom layer determined the purity of the final product and whether one or more back extractions were required.

Where a back extraction is needed, this may be carried out as follows: It was found that additional hydrochloric acid needs to be added to any fresh water to suppress the ionisation and hence the solubility of the tungstosilicic acid in water.

To a one liter separating funnel was charged
185 ml, 299.3 g product (tungstosilicic acid: MTBE complex from forward extraction—estimated 171.9 g-tungstosilicic acid)
210 ml 245.5 g 3N hydrochloric acid
The mixture became cloudy on shaking (2 minutes) and did not separate cleanly into phases on standing (aqueous layer remained cloudy).
It was found that an additional 25 ml of MTBE had to be added to facilitate the separation, presumably to replace MTBE lost to the aqueous phase.
Top layer 45 ml
Middle layer 235 ml (top+middle layers 303.8 g)
Dense Bottom 140 ml, 256.5 g.

The dense bottom layer was dried and the tungstosilicic acid recovery estimated at 98%. It was notable that the viscosity and density of the back extracted product was higher, e.g. initial sample density=1.39 back extracted material density=1.83. This trend of increase in viscosity and density continues for subsequent back extractions leading to a product with a density of about 2.5 and a viscosity similar to glycerol.

It was found that one or two back extractions within twenty minutes settling time at this scale was sufficient to remove all traces of the brine, though a further improvement can be obtained by additional extractions.

This is illustrated by the results in Table 1 obtained with 20 minutes settling time.

TABLE 1

| Extraction | Sodium ppm | Chloride ppm | Tungtsen ppm |
|---|---|---|---|
| First extraction | 325 | <190 | 761000 |
| Back extraction 1 | 16 | <52 | 771000 |
| Back extraction 2 | 8.2 | <79 | 767000 |
| Back extraction 3 | 7.5 | <63 | 761000 |

The clarification of the complex layer from the aqueous layer affects the efficiency of this extraction. This clarification/demisting can be aided by techniques such as employing demisters, or a centrifuge.

D1. This test illustrates how the method of addition of hydrochloric acid has an effect on the synthesis of heteropolyacids.

The method described by North, E O in "Organic Synthesis", 1, page 129 (Editor H S Booth, Robert E Krleger publishing company Huntington, N.Y. 1978) for the synthesis of heteropolyacid catalyst was repeated at half the reported scale. The apparatus was assembled as described in the article. Only PTFE and Pyrex® were allowed in contact with the reagents. The reaction was conducted under air. In a variation of the method of North the a reaction was conducted without bringing the reaction mixture to reflux before adding the hydrochloric acid. This is described below and the effect of adding the hydrochloric acid at reflux temperature is described in D2.

A 3 liter three-necked round-bottomed flask was equipped with a glass thermowell, pressure equalising dropping funnel, PTFE stirrer shaft and blade, and a condenser. To the flask was charged sodium tungstate dihydrate (500 g), sodium silicate (37.5 g) and water (1 liter). The mixture was stirred and the dropping funnel charged with 37%w/w) aqueous hydrochloric acid (300 ml). The heating was switched on and the acid was added dropwise over 90 minutes during which the mixture was brought to a gentle reflux. A white and then yellow precipitate was observed immediately upon addition of the acid, and the mixture then became more viscous up to 80° C. after which the viscosity decreased and the precipitate became lime green. The solid was found to be tungstic acid. These observations were not in concurrence with North's paper in which a slight precipitate of silicic acid is reported. As a result it was decided to add an additional 200 ml of 37%w/w aqueous hydrochloric acid to re-dissolve the precipitate, having determined the pH of the mixture to be acidic before further acid addition. Further refluxing of the mixture failed to re-dissolve the precipitate.

D2. It was thought that the method of addition of hydrochloric acid (aqueous HCl) in D1 was responsible for the formation of the precipitate. The paper of Tatsuhiko, H et al in Kogyo Kagaku Zasshi, 72 (9), 1945–48 (1969) describes the addition as being conducted at temperature. Experimentally the temperature of the mixture was measured as 100–106° C., 106° C. was the temperature of the kettle contents when a steady reflux was obtained In addition, the pre-equilibration of reagents was also considered to be a possible relevant factor. Accordingly, the experiment in D1 was repeated with the following changes to the experimental procedure (according to the invention). This time, the mixture of sodium tungstate, sodium silicate and water was brought to reflux and held at reflux for 2 hours before addition of the hydrochloric acid at temperature.

The solution became slowly cloudy. After completion of the acid addition, which lasted 30 minutes, the reaction mixture was held at reflux for a further hour before the heating was switched off. The mixture was allowed to cool without stirring overnight during which some additional precipitation occurred as was notable when the mixture was decanted and filtered. This precipitate was easily removed by a water wash. About 10 g of a pale yellow waxy solid was obtained and the filtrate was clear and almost colourless. This filtered solution was returned to the apparatus and a further 200 ml 37%w/w of aqueous hydrochloric acid added with stirring during which the temperature rose by about 5° C. The clear mixture was allowed to cool and used for subsequent forward liquid/liquid extraction experiments.

Yield 2131.5 g aqueous solution.

E. Repeatability of Synthesis of Heteropolyacid:

Following the previous successful experiment in D2, the procedure of D2 was conducted at full reported scale to produce material for purification studies and to check the reproducibility of the synthesis. That is, twice the previous experiments scale, e.g. a total charge of sodium tungstate (1000 g), sodium silicate (75 g), aqueous HCl (1000 ml, 37%w/w aqueous) was used. It was noted that a yellow precipitate appeared at the contact point of the acid and the solution during the initial aqueous HCl addition, which precipitate re-dissolved upon continued acid addition. This was thought to be a possible source of the faint colour seen in the final product. It was noted that the filtration to remove silica precipitate also removed most of the colour of the solution. The second addition of hydrochloric acid of similar concentration gave rise to a additional pale yellow colouration.

Yield Calculated after a MTBE Extraction:

54.2/321.7×4111.9=692.77 g of heteropolyacid in E above total production

Formula weight (FW) of heteropolyacid=2878.94 g/mol without water of hydration (or 2986 g/mol with 6 $H_2O$ of hydration)

Formula weight (FW) of sodium tungstate=329.86 g/mol

The heteropolyacid D accounted for 12 tungsten atoms per molecule, consequently, the yield of production was:

692.77/2878×12=2.88 mol (or 2.78 mol with water of hydration)

1000/329.86=3.03 mol

Yield=2.88/3.03=95% (or 92% with water of hydration).

F. Improved Synthesis of Heteropolyacid

The previous syntheses in D2 and E enabled us to find out how to improve our equipment and the synthesis method, for example by carrying out a pre-equilibration or by introducing the hydrochloric acid through the reflux flow, as a means of reducing the concentration of hydrochloric acid at the contact point with the reaction mixture and thereby reducing the colour of the final heteropolyacid solution.

A 5 liter round-bottomed flask was equipped with a PTFE mechanical stirrer, a double-condenser equipped with a 1 liter separating funnel introduction into the condensate flow, a glass thermowell, a thermocouple, temperature controller and an electric heater.

The flask was charged with the sodium tungstate (998.9 g) and dissolved in water. Then sodium silicate (75.5 g) was added. The mixture was stirred and heated to reflux for 2 hours in order to enable the heteropolyacid structural units to be formed. The separating funnel was charged with aqueous 37%w/w) HCl (approx. 600 ml) and the acid was then added dropwise along with the condensate flow, in order to dilute it and reduce the appearance of yellow precipitate. The rate of acid addition was controlled at 1 drop/2 sec at first, and after 200 ml of the acid had been added, it was increased to 2 drops/sec (approx. 20 ml/min). During the course of the addition, the mixture went white and turbid due to the formation of silica. If the rate of introduction is too fast, the condensate flow is too acid and a yellow precipitate forms at the point of contact.

The mixture was then held at reflux for another 45 minutes and allowed to cool down overnight without stirring. The mixture was filtered under vacuum to remove the excess silica, the flask cleaned and the apparatus reassembled. The filtrate was returned to the flask. 13.3 g of solids had been gathered by filtration.

The clear, uncoloured filtrate solution was again set to reflux, and an additional 400 ml of aqueous HCl (37%w/w) was added within the condensate flow (30 ml/min). No yellow precipitate appeared at the point of contact with the solution, but a yellow colour and slight turbidity appeared over time in the bulk reaction mixture.

The mixture was held at reflux for a further one hour and allowed to cool down overnight. Filtration of the final solution removed the colour and turbidity therefrom. 4089.7 g of solution were finally gathered.

Yield Calculated after a MTBE Extraction:

23.1/142×4089.7=665.3 g of heteropolyacid in F above total production

FW of heteropolyacid=2878.94 g/mol (or 2986 g/mol with 6 $H_2O$ of hydration)

FW of sodium tungstate=329.86 g/mol

The heteropolyacid accounted for 12 W atoms per molecule, consequently, the yield of production was:

665.3/2878×12=2.77 mol (or 2.67 mol with water of hydration)

1000/329.86=3.03 mol

Yield 2.77/3.03=91% (or 88% with water of hydration).

G. Purification Studies on the Product Obtained from Reaction E Without Liquid Extraction.

The method reported by North above for purification of heteropolyacid was to use liquid/liquid extraction with diethyl ether (DEE) to recover the heteropolyacid as a complex thereof from the reaction mixture. This recovered material was further purified by either crystallisation and/or back extraction. The use of other solvents for these separations was also reported e.g. ethyl acetate and methyl ethyl ketone (MEK). Both of these materials have higher auto-ignition temperature than DEE, so offer increased safety during scale-up.

We now report the use of a new extractant methyl tert-butyl ether (MTBE) as a safe alternative to DEE. The purification programme targeted the comparative assessment of these solvents.

Extractant/Solvent Choice

This work was conducted to determine the optimum solvent for the extraction. The extractions were carried out by adding the organic solvent to the heteropolyacid solution prepared in Example E, decanting the lower dense organic phase containing the heteropolyacid and then removing the solvent from this phase. This was done by the use of a rotary evaporator. The heteropolyacid was taken to dryness and submitted for analysis to measure the purity of the product. The success of the extraction was evaluated by measurement of the weight of recovered heteropolyacid and the levels of the impurities present in the product. The results for each of the extractant/solvent tested is given below:

Cyclohexane (Not According to the Invention)

The heteropolyacid was found to be insoluble in cyclohexane and as a result this solvent is unsuitable.

Methyl Ethyl Ketone (2-butanone) (Not According to the Invention):

Two phases appeared on addition of the methyl ethyl ketone (MEK) solvent, a lower organic phase and an upper aqueous phase. The heteropolyacid solid recovered from the organic phase was yellow. This appears to be due to the MEK solvent undergoing an acid catalysed Aldol condensation reaction to give pale yellow coloration (reaction by-products), which colour intensified with time, and also appeared during heating stages (in a rotary evaporator) and also in the recovered ketone. From this it can be concluded that MEK is unsuitable as an extractant/solvent.

Diethyl Ether (DEE) (Not According to the Invention):

Precautions were taken due to the high flammability and low auto-ignition temperature of DEE.

| Charge: | sample from Example E: 250 ml (316.1 g) |
| | diethyl ether 250 ml (177 g from density) |

DEE was added initially slowly with swilling and a lower, dense heteropolyacid/DEE phase was seen to separate from an upper aqueous phase. Further addition of DEE caused the formation of a third, top DEE phase above the aqueous phase. The top DEE phase did not dissolve the dense heteropolyacid/DEE phase as shown below:

The mixture was shaken for 5 min, let to settle for 30 seconds. Three phases appeared:

| top | predominately ether-200 ml (149 g) |
| middle | aqueous-140 ml (258.2 g) |
| bottom | heteropolyacid complex-50 ml (85 g) |

The bottom phase was slightly milky of appearance. This bottom phase was collected and rotary evaporated. 75.1 g of white microcrystaline solid were recovered. The top phase was evaporated to dryness. 0.7 g of white solid were recovered (demonstrating the poor solubility of the heteropolyacid/ether complex in excess ether).

From these results it would appear that DEE can function as a solvent for the extraction of heteropolyacid from the product reaction mixture. However, a significant quantity of ether was found to be present in the middle aqueous layer and a further drawback is that DEE has a low auto-ignition point and is highly flammable.

Methyl tert-butyl Ether (MTBE) (According to the Present Invention):

To a 1 liter separating funnel was added

| heteropolyacid solution from E: | 255 ml (321.7 g) |
| MTBE: | 63 ml (45.1 g) |

This mixture was shaken for 2 minutes and allowed to settle for 5 minutes. Appearance was milky, the separation was very slow. Only two phases appeared. An additional 30 ml (21.7 g) of MTBE was added and the extraction repeated. Again, only two phases could be seen. A final further addition of 50 ml (37.2 g) of MTBE was made. The extraction was repeated and allowed to settle for 10 minutes. The appearance of the three phases was less turbid than previously observed.

| Top layer: | 50 ml (58.4 g) |
| Middle layer: | 320 ml (268.6 g) |
| Bottom layer: | 60 ml (89.2 g) |

The bottom layer was evaporated to dryness, giving 54.2 g of white solid.

Yield=2.88/3.03=95% (or 92% with water of hydration). From these results, MTBE is as efficient as ether for heteropolyacid recovery. It is preferred over ether due to its higher auto-ignition temperature and lower solubility in the aqueous layer.

Ethyl Acetate

To a 1 liter separating funnel was added

| heteropolyacid solution: | 150 ml (178.6 g) |
| ethyl acetate: | 50 ml (43.6 g) |

The introduction of ethyl acetate was followed by a milky appearance, which disappeared gradually during the 2 minutes shaking. It was then allowed to settle for 5 minutes. Appearance of all three phases was clear, just a few bubbles were seen at each interface. The separation was much quicker than with MTBE.

| Top layer: | 10 to 15 ml (13.1 g) |
| Middle layer: | 120 ml (146.4 g) |
| Bottom layer: | 40 ml (61.1 g) |

The bottom layer was evaporated to dryness, giving 34.0 g of white solid.

Yield=3.26/3.03>100%.

This yield doesn't take into account the possible presence of trapped water in the solid.

Back Extraction

The target of these experiments was to further reduce the levels of impurities in the heteropolyacid, from those obtainable in a single forward extraction. The main impurity being inorganic salts, especially the halides of the alkali metals such as e.g. sodium chloride. Forward liquid/liquid extraction was found to remove a significant proportion of the impurities present in the reaction mixture from the heteropoly acid product. For further product purification, North proposes two methods: (i) crystallisation (which would obviously be expensive on a commercial scale) and (ii) liquid/liquid back extraction. This latter method was explored here.

Ethyl Acetate (Not According to the Invention):

Charge:

Product from preceding ethyl acetate forward extraction experiment:

293.0 g (170 ml, density=1.72, estimated 179.2 g heteropolyacid)

Aqueous HCl (3N): 202.6 g (180 ml)

The mixture went milky after addition of acid. After the mixture was shaken for 2 minutes and standing for 15 minutes, only one turbid phase appeared, with a very slow precipitation of a white solid.

An additional 41 g (45 ml) of ethyl acetate was added to the mixture and it was shaken again. No improvement appeared.

Seven further additions of ethyl acetate were conducted, totalling 509 g of ethyl acetate. No separate phase appeared, but each further addition increased the flocculation of the solid. It was inferred from these observations that hydrolysis of the ethyl acetate had probably occurred which hindered the phase separation. Ethyl acetate is therefore not a suitable back extraction solvent.

Methyl Tert-butyl Ether (MTBE) (According to the Invention):

A series of consecutive back extractions using MTBE were conducted to evaluate the suitability of the solvent.

Back Extraction I

Charge:

Heteropolyacid-MTBE complex from a forward extraction—185 ml (299.3 g, estimated 171.89 g heteropolyacid) was mixed with Aqueous HCl (37%w/w used in this case we have found subsequently that 3N is also useable)—210 ml (245.5 g)

The mixture went milky on shaking, a slow separation was observed with no top layer. An additional 18.4 g MTBE (~25 ml) was added and the mixture shaken. The mixture remained milky in appearance but after 10 minutes three layers had formed, which slowly cleared to become less turbid.

| Top layer | 45 ml |
|---|---|
| Middle layer | 235 ml (Top + middle layers = 303.8 g) |
| Bottom layer | 140 ml (256.5 g) |

The bottom layer was more viscous than the first base extraction sample (sample density 1.39, back extracted material density=1.83)

A sample of the back extracted material after this first back extraction was dried and weighed to give a heteropoly acid recovery=167.93/171.89×100=97.7%.

Back Extraction 2

Charge:

| Product from Back extraction 1 | 120 ml (234.2 g, 153.33 g heteropolyacid) was mixed with |
|---|---|
| Aqueous HCl (37% w/w) | 120 ml (140.2 g) |

Shaking the above mixture gave two phases but bottom phase started to stick to the surfaces and was very milky in appearance.

MTBE (11.5 g, ~16 ml) was added to this mixture and the mixture re-shaken. This time the separation was quicker and within about 5 minutes a bottom phase was formed which was more tractable.

| Top layer | = 40 ml |
|---|---|
| Middle layer | = 135 ml (weight top + middle layers = 194.6 g) |
| Bottom | = 75 ml (weight 187.2 g, density 2.496) |

A sample of the bottom layer was dried and weighed which showed that heteropolyacid recovery=146.7/153.33×100= 95.7%

Back Extraction 3

Charge:

| Product from Back extraction 2: | 68 ml (159.9 g, 125.34 g heteropolyacid) was mixed with |
|---|---|
| Aqueous 37% w/w HCl: | 70 ml (81.8 g) and |
| MTBE: | 9 ml (6.8 g) |

The resultant milky mixture settled in 2–3 minutes to give the following three phases:

| Top layer | = 13 ml |
|---|---|
| Middle layer | = 80 ml (weight top + middle layers = 117 g) |
| Bottom layer | = 50 ml (weight 129 g, density 2.58 slight increase from above) |

The product from this extraction was taken to dryness and weighed.

Weight of product=102 g heteropolyacid recovery=102/125.34×100=81.4%

These results demonstrate that MTBE is an excellent solvent for back extraction and gives rise to a heteropolyacid substantially free of extraneous cations.

We claim:

1. A process for purifying a heteropolyacid which comprises:

subjecting an aqueous solution comprising (i) the heteropolyacid and (ii) salt impurities to at least one liquid/liquid extraction step with an organic solvent, characterised in that the organic solvent comprises a dihydrocarbyl ether having at least 5 carbon atoms.

2. A process as claimed in claim 1, wherein the organic solvent is a dihydrocarbyl ether having at least 5 carbon atoms.

3. A process for the synthesis of a heteropolyacid substantially free of extraneous cations, said process comprising:

a. reacting (i) an aqueous solution of one or more alkali or alkaline earth metal salts selected from a tungstate and a molybdate under reflux with (ii) an alkali or an alkaline earth metal silicate or an alkali or an alkaline earth metal phosphate to form in an impure aqueous solution comprising the heteropolyacid of the chosen salt and any other salt formed in situ or used as a reactant;

b. filtering and cooling the impure aqueous solution comprising the heteropolyacid;

c. purifying the cooled, impure aqueous solution from (b) by at least one liquid/liquid extraction with an organic solvent to enable the heteropolyacid to form a complex in situ with the organic solvent and allowing the extract to separate into two or more phases including inter alia a dense organic phase which comprises the dissolved complex of the heteropolyacid and which dense organic phase is below the aqueous phase;

d. recovering the dense organic phase from (c) and mixing it thoroughly with water to form a separate layer of a dilute aqueous mixture and e. recovering a concentrated 20–80%w/w aqueous solution of the heteropolyacid substantially free of organic impurities from the dilute aqueous mixture, wherein the organic solvent used in the liquid/liquid extraction step (c) comprises a dihydrocarbyl ether having at least 5 carbon atoms.

4. A process as claimed in claim 3, wherein the organic solvent used in the liquid/liquid extraction step (c) is a dihydrocarbyl ether having at least 5 carbon atoms.

5. A process as claimed in claim 1 or claim 3 wherein the dihydrocarbyl ether solvent has 5 to 20 carbon atoms.

6. A process as claimed in claim 1 or claim 3, wherein the dihydrocarbyl ether solvent is such that at least one of its hydrocarbyl groups is a branched chain alkyl group.

7. A process as claimed in claim 1 or claim 3, wherein the dihydrocarbyl ether solvent is selected from the group consisting of: ethyl propyl ether, methyl butyl ether, ethyl butyl ether, and methyl amyl ether.

8. A process as claimed in claim 1 or claim 3, wherein the dihydrocarbyl ether solvent is methyl tertiary butyl ether or methyl tertiary amyl ether.

9. A process as claimed in claim 1 or claim 3, wherein the heteropolyacid is a silicotungstic acid.

10. A process as claimed in claim 1 or claim 3, wherein the heteropolyacid is selected from the group consisting of:

| | |
|---|---|
| 12-tungstophosphoric acid | $H_3[PW_{12}O_{40}]\cdot xH_2O$ |
| 12-molybdophosphoric acid | $H_3[PMo_{12}O_{40}]\cdot xH_2O$ |
| 12-tungstosilicic acid | $H_4[SiW_{12}O_{40}]\cdot xH_2O$ |
| 12-molybdosilicic acid | $H_4[SiMo_{12}O_{40}]\cdot xH_2O$ |

11. A process as claimed in claim 1 or claim 3, wherein the dihydrocarbyl ether solvent is substantially immiscible with water.

12. A process as claimed in claim 3, wherein acid is added to the reaction mixture in two stages, firstly during step a), and secondly, prior to step c).

13. A process as claimed in claim 3, wherein hydrochloric acid is added to the reaction mixture in two stages, firstly during step a), and secondly, prior to step c).

* * * * *